United States Patent [19]
Lane, III et al.

[11] 3,854,272
[45] Dec. 17, 1974

[54] CROP GATHERING BELT

[76] Inventors: James Murray Lane, III, 12304 E. Iowa Dr., Denver, Colo. 80012; Guy E. Lingenfelter, 135 Emerald Dr., Broomfield, Colo. 80020

[22] Filed: Feb. 20, 1973

[21] Appl. No.: 333,934

[52] U.S. Cl.................. 56/98, 56/119, 74/231 C
[51] Int. Cl........................................... A01d 45/02
[58] Field of Search........ 56/98, 119; 198/165, 171; 74/23 C; 156/138

[56] References Cited
UNITED STATES PATENTS

| | | | |
|---|---|---|---|
| 2,637,436 | 5/1953 | Andrews | 56/119 X |
| 3,245,518 | 4/1966 | Reibel et al. | 74/231 C X |
| 3,338,107 | 8/1967 | Kiekhaefer | 74/231 C X |
| 3,339,354 | 9/1967 | Kessler | 56/98 |
| 3,472,563 | 10/1969 | Irgens | 74/231 C X |
| 3,582,154 | 6/1971 | Russ, Sr. | 74/231 C X |
| 3,621,727 | 11/1971 | Cicognani | 74/231 C X |

Primary Examiner—Robert Peshock
Assistant Examiner—J. M. Eskovitz
Attorney, Agent, or Firm—H. W. Oberg, Jr.; Raymond Fink; Curtis H. Castleman, Jr.

[57] ABSTRACT

Endless means for conveying employing juxtaposed facing belts, each belt including two generally parallel layers of flexible material sandwiched tensile section. The belt is adapted for use with toothed pulleys. A plurality of longitudinally spaced lugs extend from one layer to be meshable with teeth of a pulley and a plurality of longitudinally spaced crop engaging members extend from the second layer.

9 Claims, 9 Drawing Figures

PATENTED DEC 17 1974 3,854,272
SHEET 1 OF 2
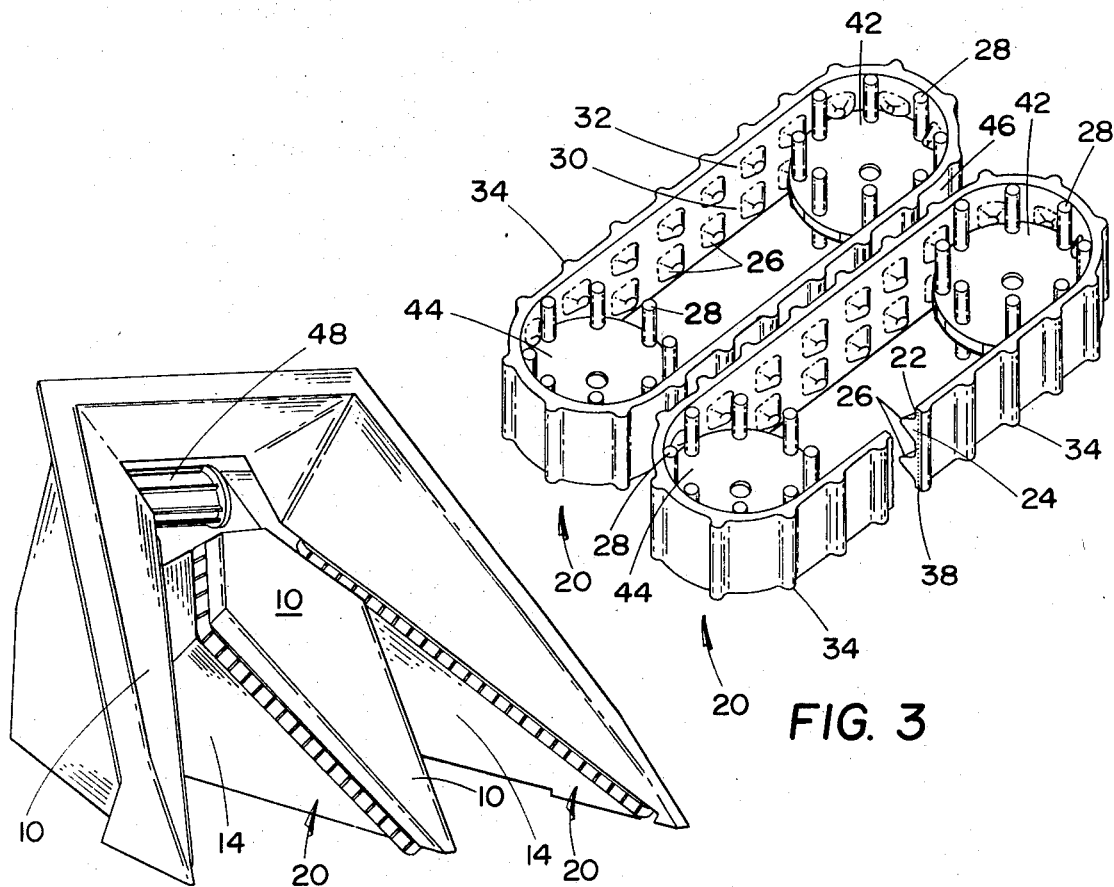
FIG. 3
FIG. 1
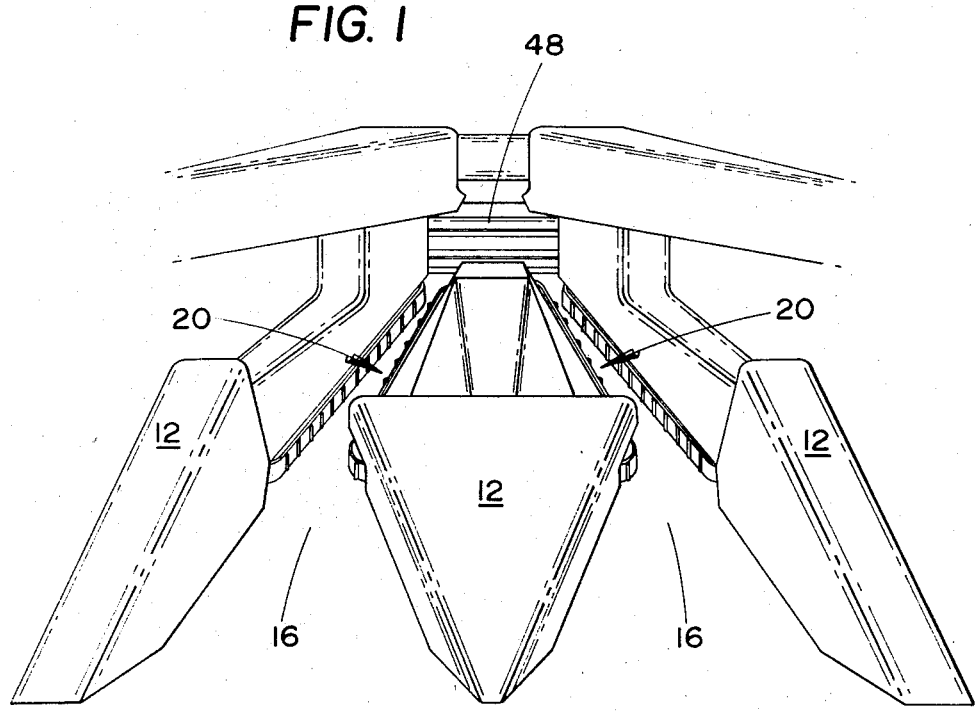
FIG. 2

CROP GATHERING BELT

BACKGROUND OF THE INVENTION

The invention relates to harvesters, but more particularly, the invention relates to cornstalk type harvesters with endless means for gathering and conveying several crops.

A stalk typ harvester typically embodies a vehicle adapted to travel down one or more rows of field crop. The harvester may have forwardly extending aprons to channel downed or standing crop to a cutting means and then to endless conveying means by which crop is delivered to additional mechanisms for further treating or processing. Some aprons may also include endless conveying means. The conveying means includes two juxtaposed and oppositely facing endless means which may be arranged generally parallel with each other or follow separate serpentine paths. Usually, the endless means are arranged to define a conveying area that is inclined in relation to the ground.

Machines adapted to harvest heavier field crops such as corn, require positive drive endless means for continuously feeding the crop rearwardly into the machine which may be equipped with other mechanism such as a knife cylinder for further crop processing. In conventional conveying means it is heretofore known to employ steel link endless chains to convey crop rearwardly in the machine for further processing. The metallic chains are equipped with rigid stalk engaging lugs or stalk engaging means that include strips of flexible material attached to the chain with fasteners to define a plurality of generally sinuous loops. Examples of such metallic chains and their paths of operation appear in U.S. Pat. Nos. Re19,672; 2,713,240; and 3,339,354. Such metallic chains, whether equipped with rigid stalk engaging or strips of flexible material formed into loops, create many problems among which are noisy operation; dislodged metallic parts, fouling or damaging further processing mechanisms such as knife cylinders; inefficient feedings; high cost; and need for lubrication.

SUMMARY OF THE INVENTION

According to the present invention, the disadvantages are eliminated or substantially reduced, and an improved crop conveying means is provided featuring quiet operation without lubricants; elimination or substantial elimination of metallic parts to avoid damaging additional crop processing mechanisms; smooth crop conveying; and lower cost. More specifically, an object of the invention is to provide a crop harvester having endless means including two juxtaposed belts each of which has first and second parallel layers of flexible material, the layers sandwiching a tensile section of high modulus material. One layer includes a plurality of longitudinally spaced lugs meshable with teeth of a toothed pulley, while the other layer defines or supports a crop engaging surface.

These and other objects or advantages of the invention will be apparent by reviewing the drawings and description thereof wherein:

FIG. 1 is a perspective view of a portion of a two-row type crop harvester equipped with endless crop conveying belts of the invention arranged in serpentine fashion.

FIG. 2 is a perspective front view of a portion of another two-row type harvester equipped with two sets of endless crop conveying belts of the invention arranged in generally parallel fashion.

FIG. 3 is an isometric view of a portion of FIG. 2 with structure removed to expose one set of endless conveyor belts, with one belt cutaway, and toothed pulleys therefor.

DESCRIPTION OF PREFERRED EMBODIMENTS

Portions of gathering means and endless means of two types of two-row crop harvesters are shown in FIGS. 1 and 2 as will be recognized by those familiar with ensilage harvesters. The gathering portions are made of forwardly extending fender segments 10, 12 that rearwardly converge to stalk receiving passageways 14, 16 in which are located juxtaposed and oppositely facing endless belts 20. The belts may be entrained around pulleys in generally parallel fashion as shown in FIG. 2 or in some harvesters, the belts may follow a more rigorous serpentine path to additionally follow contours of the fender segments 10 or other machine elements as shown in FIG. 1. Operation and construction of the belts 20 are substantially the same whether they are used in parallel or sepentine fashion.

Figure 4:
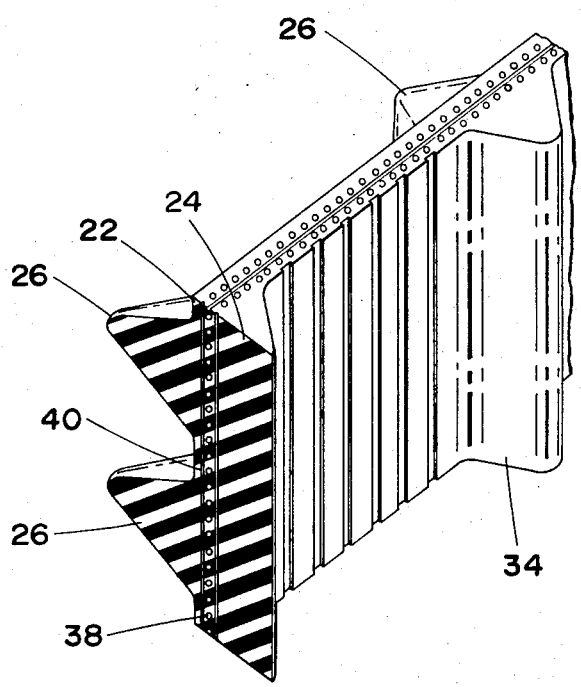
FIG. 4 is an enlarged view of the cutaway portion of FIG. 3.

Belts of juxtaposed pairs are similar in construction but may be of either equal or unequal lengths. Referring more specifically to FIGS. 3 and 4, each belt includes first 22 and second 24 generally parallel layers of polymeric flexible, resilient material. For example, polymeric materials which include the moldable natural or synthetic polymers, or the castable rubbers or urethanes may be used. A positive driving portion is formed of the first layer 22. The driving portion includes a plurality of longitudinally spaced lugs 26. The lugs may have any desired spacing for meshing with teeth 28 of a toothed pulley. Preferably, the teeth 28 are substantially equally spaced from each other in such a manner that the longitudinal spacing between lugs is greater than the longitudinal base portion of the lugs for reasons which will later be explained. One or more rows of lugs may be used. Preferably, the driving portion includes two rows 30, 32 of equally longitudinally spaced lugs where lugs of one row are in lateral alignment with the lugs of the second row. The lugs 26 are positioned near the circumferential edges and the lateral spacing is greater than the lateral base portion of the lug. Obviously, the number of rows, spacing between lugs, and size of lugs influence the configuration of the toothed pulley.

Figure 5:
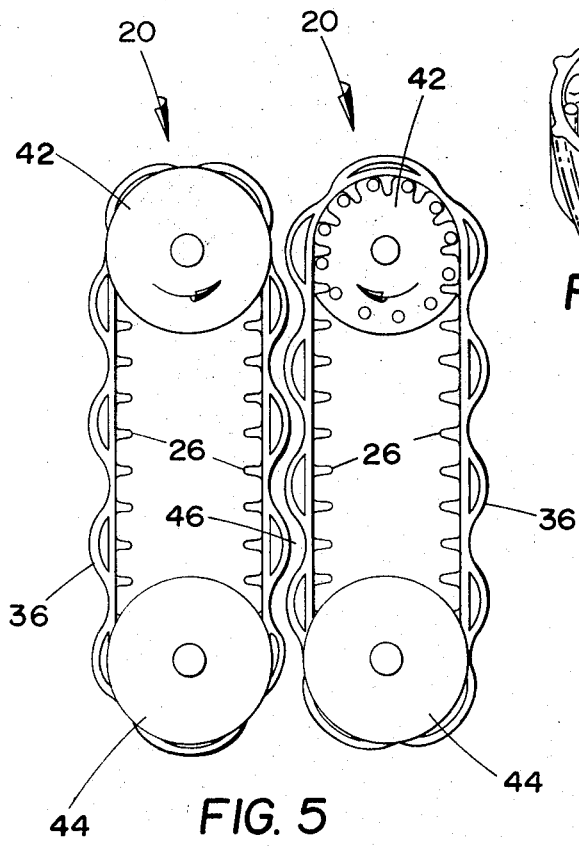
FIG. 5 is a plan view of a set of belts showing an alternate form of the invention.

The second layer 24 of polymeric material is generally parallel to the first layer and defines the crop engaging side of the belt. The crop engaging means may be separately fastened to but is preferably an integrally molded part of the second layer. In a preferable configuration, the crop engaging means includes a plurality of longitudinally spaced ribs 34 that extend transversely or obliquely across the belt. In another preferable configuration as shown in FIG. 5, the crop engaging means consists of a plurality of longitudinally spaced, integrally molded loops 36 extending generally in sinuous fashion around the outer circumference.

A tensile section 38 of high modulus material is disposed or sandwiched between the first and second layers. The tensile section may be formed in known manner such as by spiraling one or more strands, or by overlapping a strip of material.

Optionally, a ply of laterally oriented material 40 is disposed between the first 22 and second layers 24 juxtaposed the tensile section 38. The lateral reinforcement 40 may be in any desired form such as square woven or bias fabric, or cords. When rubber is used as the polymeric material, the lateral reinforcement may advantageously by a ply of fiber loaded polymeric material where the fibers are oriented generally in the same direction to be generally lateral of the belt.

When the gathering belt of the invention is in use, belts are paired and arranged in juxtaposed position oppositely facing each other such that at least a portion of the paired belts are generally parallel. The belts are each tensioned around at least two pulleys 42, 44 where one of which is a toothed driver pulley. The drivers 42 receives rotational power from means of the harvester, not shown. The toothed driver pulleys of a pair rotate in opposite directions from each other to propel the belts in a rearward conveying manner, each pair of belts may be inclined rearwardly upward. The generally parallel portions of a pair of belts are preferably spaced close to each other such that the crop engaging means of the belt intermesh 46. When ribs 34 are used as the crop engaging means, the rib height may be varied to affect how aggressively crops are engaged. A rib height of around one inch or less is normally sufficient.

Figure 7:
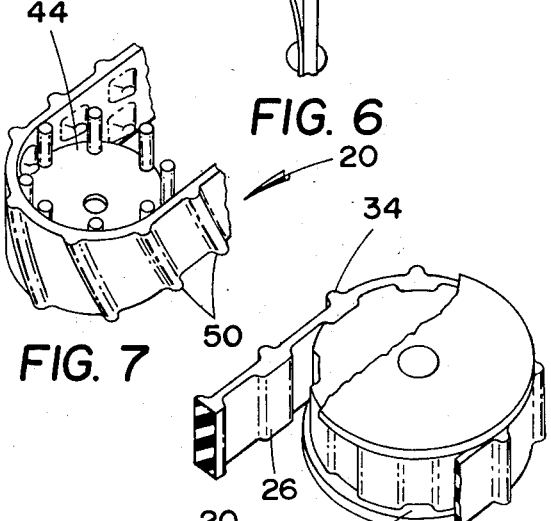
FIGS. 7, 8 and 9 are partial isometric views showing alternate belt and toothed pulley constructions.

When laterally oriented ribs 34 are used, the ribs are usually inclined in relation to the ground since the belt is typically inclined. The inclined ribs tilt the conveyed crop forwardly such that the crop is delivered butt first to any further crop processing mechanism such as a chopper 48. The degree to which the crop is tilted may be altered by arranging the ribs obliquely 50 across the crop engaging side of the belt as shown in FIG. 7. Where a greater degree of crop tilting is desired, the ribs may be arranged obliquely in a forward manner whereas when a lesser amount of crop tilting is desired, the ribs may be arranged obliquely in a rearward manner.

Although only one toothed pulley is required, it may be desirable to include additional toothed pulleys for the purpose of driving other harvester mechanisms such as a crop severing means.

When the span between two pulleys becomes too great, it is desirable to support the inner surface of each belt with one or more wheels not shown. Here, the desirability for two row lugs may be readily understood. The support wheels may easily be aligned to rotate between the two rows 30, 32 to help keep the belt 20 longitudinally aligned. The sidewall of the wheels may easily engage the sides of the lugs to longitudinally guide the belt.

Figures 8, 9:
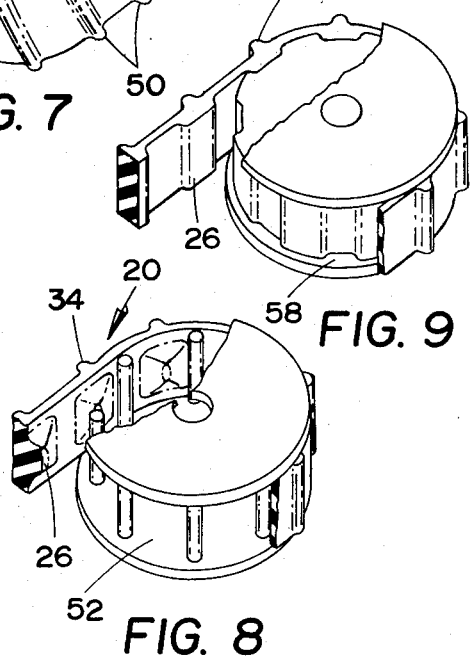

Any variety of toothed pulleys may be used. For example, when a single row of lugs is used as shown in FIGS. 8, and 9 a "squirrel cage" 52 or "flanged" 58 type pulley may be used. When two rows of lugs are used, the squirrel cage, or single wheel of FIGS. 3, and 7 with axially aligned teeth may be used. Whatever the toothed pulley configuration, it is preferred to have the teeth of the pulley less in thickness than the longitudinal spacing between the lugs, and to have the wheel width less than the lateral spacing between lug rows (for the single wheel type pulley) for the purpose of substantially reducing the probability of fouling the drive by providing clearance for debris such as small pieces of row crop.

The belt arrangement of the invention advantageously reduces noise as there are no metal chains engaging the pulleys. Also, no lubrication is required of the belts. In the preferred embodiment, the belt has integrally molded lugs and crop engaging means of polymeric material; thus, there are no metal parts to become dislodged and conveyed to damage further crop processing mechanisms. Should part of the polymeric belts become dislodged, the probability of damaging additional crop processing mechanisms is substantially eliminated.

ADDITIONAL SPECIES

Figure 6:
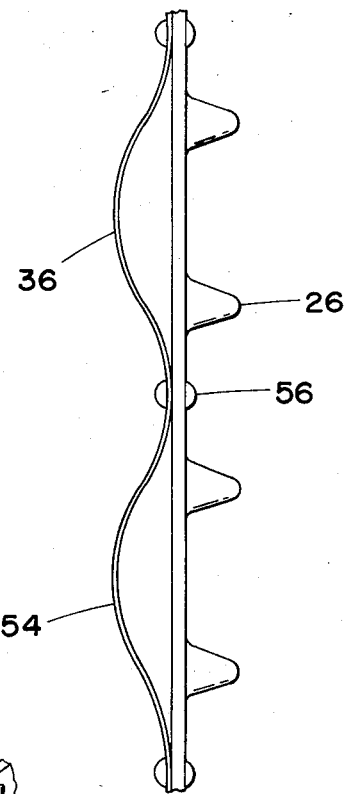
FIG. 6 is a plan view similar to FIG. 5 showing a portion of an alternate belt construction.

In some applications it may be desirable to have the crop engaging means of a different material. For example, it may be desirable to have the crop engaging portion of reinforced rubber, and the lug drive portion of urethane. In such a situation and as shown in FIG. 6, the crop engaging portion may be a strip of reinforced rubber 54 formed in a plurality of longitudinally spaced loops 36 around the periphery of the belt. Any desirable means such as rivets, 56 adhesives or cross-linking may be used to attach the strip 54 to the belt. Such a belt offers the advantages as listed above with the exception that a few metal rivets may be used. However, dislodged metal rivets do not present the same magnitude of problems that dislodged chain links do to further crop engaging mechanisms.

The foregoing detailed description is made for purpose of illustration only and is not intended to limit the scope of the invention which is to be determined from the following claims.

What is claimed is:

1. In harvesting apparatus for gathering and conveying severed crops, said apparatus of the type having two oppositely facing endless means, for conveying crops, gathering means for directing crop to the endless means, and dispersing means for directing crop from the endless means, wherein improvement in the endless means comprises:

at least two oppositely facing generally flat belts each of which is trained around at least two pulleys where at least one pulley for each belt is toothed, each belt comprising:

a first layer of flexible material extending longitudinally of the belt to define a driving portion including a plurality of integrally molded longitudinally spaced lugs adapted to mesh with teeth of the pulley to define a positive belt drive, the lugs having longitudinal and lateral base portions a second layer of flexible material spaced from and generally parallel to said first layer to define a crop engaging member that includes a plurality of spaced projecting members aligned generally transversely; and a tensile section of high modulus material disposed between said first and second layers;

said belts adapted and arranged so a portion of the crop engaging member of one belt is juxtaposed with the crop engaging member of the oppositely facing second belt.

2. A crop harvesting apparatus as set forth in claim 1 wherein the longitudinally spaced lugs include at least two laterally spaced rows of lugs, the lugs of one row substantially laterally aligned with the lugs of the second row.

3. A crop gathering belt as set forth in claim 1 and further including at least one ply of generally laterally aligned reinforcement of high modulus material disposed between said first and second layer.

4. Crop harvesting apparatus as set forth in claim 2 wherein the teeth of the toothed pulley have a circumferential thickness that is substantially less than the longitudinal spacing of the lugs.

5. Crop gathering apparatus as set forth in claim 1 wherein the longitudinal spacing between lugs is greater than the longitudinal base portion of the lugs.

6. Crop gathering apparatus as set forth in claim 1 wherein the spaced projecting members have a base thickness that is substantially less that the longitudinal spacing between the projecting members.

7. Crop gathering apparatus as set forth in claim 2 wherein the lateral spacing between the rows of lugs is greater than the lateral base portion of the lugs.

8. A harvesting apparatus for gathering and conveying severed crops, said apparatus of the type having two oppositely facing endless means, for conveying crops, gathering means for directing crop to the endless means, and dispersing means for directing crop from the endless means, wherein improvement in the endless means comprises:

at least two oppositely facing generally flat belts each of which is trained around at least two pulleys where at least one pulley for each belt is toothed, each belt comprising:

a first layer of flexible material extending longitudinally of the belt to define a driving portion including a plurality of integrally molded longitudinally spaced lugs adapted to mesh with teeth of the pulley to define a positive belt drive;

a second layer of flexible material spaced from and generally parallel to said first layer to define a crop engaging member that includes a plurality of integrally molded and laterally spaced loops extending generally laterally of the belt; and a tensile section of high modulus material disposed between said first and second layers;

said belts adapted and arranged so a portion of the crop engaging member of one belt is juxtaposed with the crop engaging member of the oppositely facing second belt.

9. A harvesting apparatus for gathering and conveying severed crops, said apparatus of the type having two oppositely facing endless means, for conveying crops, gathering means for directing crop to the endless means, and dispersing means for directing crop from the endless means, wherein improvement in the endless means comprises:

at least two oppositely facing generally flat belts each of which is trained around at least two pulleys where at least one pulley for each belt is toothed, each belt comprising:

a first layer of flexible material extending longitudinally of the belt fo define a driving portion including a plurality of integrally molded longitudinally spaced lugs adapted to mesh with teeth of the pulley to define a positive belt drive;

a second layer of flexible material spaced from and generally parallel to said first layer to define a crop engaging member that includes a plurality of spaced projecting members aligned obliquely of the belt;

a tensile section of high modulus material disposed between said first and second layers;

said belts adapted and arranged so a portion of the crop engaging member of one belt is juxtaposed with the crop engaging member of the oppositely facing second belt.

* * * * *